United States Patent
Iwasaki

(10) Patent No.: US 9,904,972 B2
(45) Date of Patent: Feb. 27, 2018

(54) INFORMATION PROCESSING APPARATUS, CONTROL METHOD, PROGRAM, AND RECORDING MEDIUM

(71) Applicant: SQUARE ENIX HOLDINGS CO., LTD., Tokyo (JP)

(72) Inventor: Tetsuji Iwasaki, Montreal (CA)

(73) Assignee: SQUARE ENIX HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 14/906,619

(22) PCT Filed: Aug. 1, 2014

(86) PCT No.: PCT/JP2014/070957
§ 371 (c)(1),
(2) Date: Jan. 21, 2016

(87) PCT Pub. No.: WO2015/020178
PCT Pub. Date: Feb. 12, 2015

(65) Prior Publication Data
US 2016/0163017 A1    Jun. 9, 2016

Related U.S. Application Data

(60) Provisional application No. 61/862,590, filed on Aug. 6, 2013.

(51) Int. Cl.
*G06T 1/20* (2006.01)
*G06F 3/14* (2006.01)
(Continued)

(52) U.S. Cl.
CPC ............. *G06T 1/20* (2013.01); *A63F 13/352* (2014.09); *A63F 13/355* (2014.09); *A63F 13/497* (2014.09); *G06T 1/60* (2013.01)

(58) Field of Classification Search
CPC . G06T 1/20; G06T 1/60; A63F 13/355; A63F 13/497; A63F 13/352
See application file for complete search history.

(56) References Cited

U.S. PATENT DOCUMENTS 6,219,032 B1 * 4/2001 Rosenberg .............. A63F 13/06
345/157
7,095,416 B1    8/2006 Johns et al.
(Continued)

FOREIGN PATENT DOCUMENTS

| JP | 2012-063818 | 3/2012 |
| JP | 2013-149178 | 8/2013 |
| WO | 2012/168923 | 12/2012 |

OTHER PUBLICATIONS

International Search Report (ISR) from International Searching Authority (Japan Patent Office) in International Pat. Appl. No. PCT/JP2014/070957, dated Nov. 11, 2014.
(Continued)

*Primary Examiner* — Tapas Mazumder
(74) *Attorney, Agent, or Firm* — Greenblum & Bernstein, P.L.C.

(57) ABSTRACT

An information processing apparatus acquires a rendering command used to cause a rendering apparatus to render a screen and records the acquired rendering command. The information processing apparatus outputs the recorded rendering command to the rendering apparatus for rendering the screen.

9 Claims, 9 Drawing Sheets

(51) Int. Cl.
    *A63F 13/355*     (2014.01)
    *A63F 13/497*     (2014.01)
    *A63F 13/352*     (2014.01)
    *G06T 1/60*     (2006.01)

(56) References Cited

U.S. PATENT DOCUMENTS

| | | | |
|---|---|---|---|
| 2006/0274072 A1* | 12/2006 | Bhatia | G06F 11/3688 |
| | | | 345/501 |
| 2010/0211933 A1 | 8/2010 | Kiel et al. | |
| 2011/0157196 A1 | 6/2011 | Nave et al. | |
| 2012/0081378 A1* | 4/2012 | Roy | G06T 15/005 |
| | | | 345/522 |
| 2012/0299938 A1 | 11/2012 | Iwasaki | |
| 2014/0108967 A1 | 4/2014 | Markham et al. | |

OTHER PUBLICATIONS

Max K. Agoston, "Computer Graphics and Geometric Modelling: Implementation & Algorithms", Springer-Verlag London Limited (2005).
"Direct3D", Microsoft Corp., Redmond WA (undated).
"OpenGL" managed by Khonos Group, Beaverton, OR (undated).

* cited by examiner

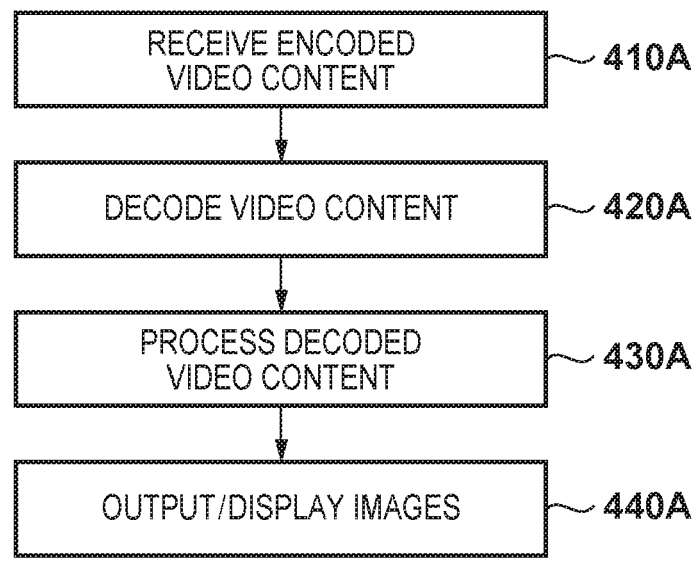
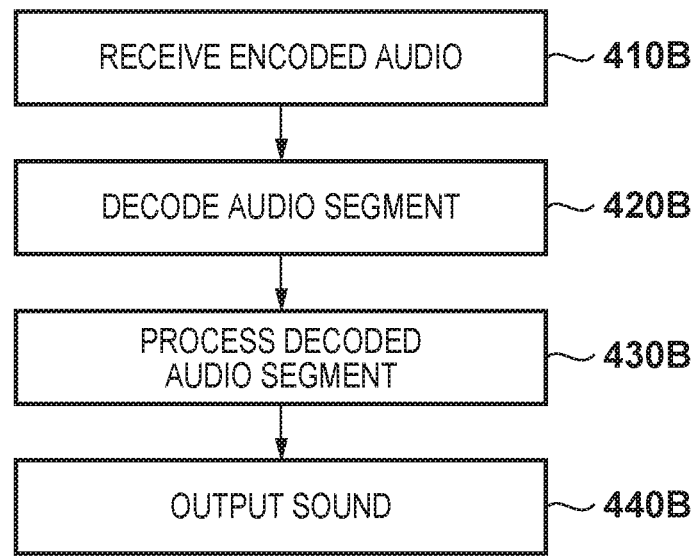

INFORMATION PROCESSING APPARATUS, CONTROL METHOD, PROGRAM, AND RECORDING MEDIUM

CLAIM OF PRIORITY

This application is a U.S. National Stage of PCT/JP2014/070957 filed on Aug. 1, 2014, and claims the priority benefit of U.S. provisional application 61/862,590, filed Aug. 6, 2013, the contents of which is expressly incorporated by Reference herein in their entireties.

TECHNICAL FIELD

The present invention relates to an information processing apparatus, a control method, a program, and a recording medium, and particularly to a screen rendering simulation technique.

BACKGROUND ART

Programs such as electronic games and software applications undergo tests in the development process to, for example, check whether desired operations or functions defined by specifications are implemented or check the load on hardware associated with implementation of the functions. Some programs are actually used by a plurality of test users in one or more phases to test the same items until they are actually released (sold or distributed) and used by general users.

The latter tests are conducted especially for programs associated with services to be provided via a server such as an MMORPG. Normally, the latter tests include a so-called "α test" that is conducted by causing limited users to freely operate some functions of a product and a "β test" that is conducted by causing non-limited users to freely operate some or all functions of a product, and behaviors caused by a user operation and the like within a set period are tested.

In the above-described tests, if a desired operation or function is not implemented, or an unexpected operation is found, a situation (for example, operation pattern or load state) that replicates the same operation or the like is specified, necessary correction is performed, and it is checked again whether improvement is done (so-called bug fix) in the same situation. However, to attain the same situation again to check the bug fix, a condition that is not necessarily easy may be needed. Hence, in practice, a method is employed in which user's operation inputs and the like are recorded as a log (history of key and button inputs), and at the time of check, the log is reproduced to replicate the same situation (Japanese Patent Laid-Open Nos. 2012-063818 and 2013-149178).

However, when such an operation input log is used, replication of the same situation may fail. In a program including screen rendering, normally, it is ideal to complete update processing of parameters necessary for screen rendering, commands to hardware that performs rendering, and rendering processing by the hardware within one frame period decided by the update frequency (frame rate) of the screen. On the other hand, if the number of objects to be rendered on the screen is large or the number of threads to be performed at the same time is large, the display frame rate and the processing frame rate may be different. That is, the display update interval and the time interval for completing processing associated with each frame can be varied by various parameters. Hence, if the processing frame rate upon recording the operation input log is different from the processing frame rate at the time of check, the shifts accumulate in the processing, and it is therefore difficult to replicate the same situation. Especially in a test aiming at bug fix associated with screen rendering contents, it may be impossible to specify whether the bug fix is done by correcting processing concerning rendering or a desired operation is implemented by other factors including frame variations.

SUMMARY OF INVENTION

The present invention was made in view of such problems in the conventional technique. The present invention provides an information processing apparatus for replicating the same rendering contents, a control method, a program, and a recording medium.

The present invention in its first aspect provides an information processing apparatus comprising: acquisition means for acquiring a rendering command used to cause rendering means to render a screen; recording means for recording the rendering command acquired by the acquisition means; and output means for outputting the rendering command recorded by the recording means to the rendering means for rendering the screen.

The present invention in its second aspect provides a control method of an information processing apparatus, the method comprising: an acquisition step of acquiring a rendering command used to cause rendering means to render a screen; a recording step of recording the rendering command acquired in the acquisition step; and an output step of outputting the rendering command recorded in the recording step to the rendering means for rendering the screen.

Further features of the present invention will become apparent from the following description of exemplary embodiments (with reference to the attached drawings).

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 4A and 4B are flowcharts showing operation of a client device to process received video and audio, respectively, in accordance with non-limiting embodiments of the present invention.

DESCRIPTION OF EMBODIMENTS

Figure 1A:
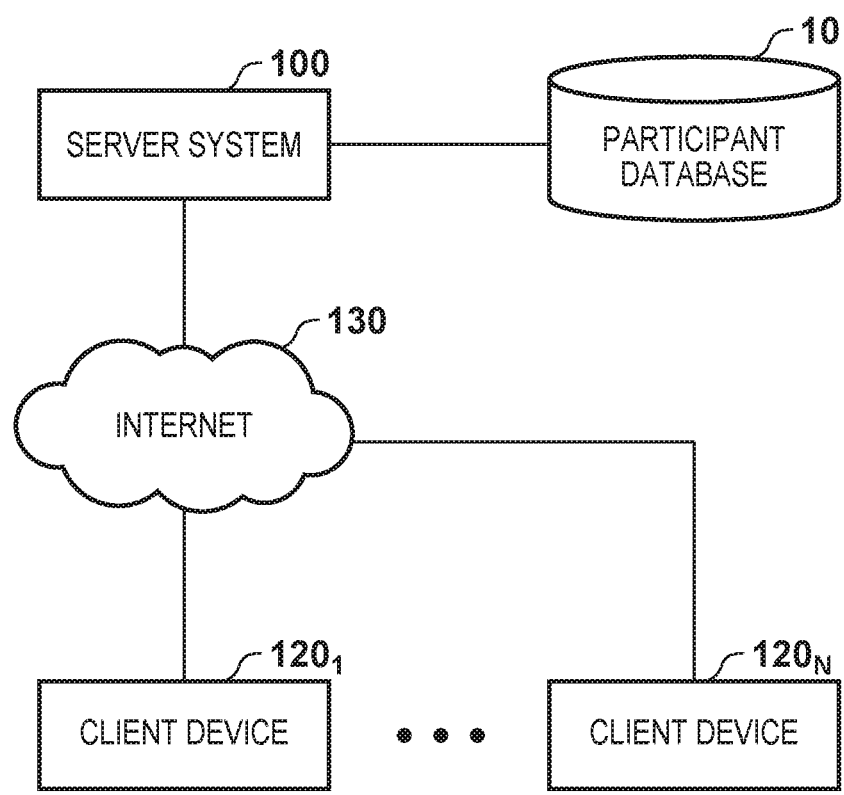
FIG. 1A is a block diagram of a cloud-based video game system architecture including a server system, according to a non-limiting embodiment of the present invention.

FIG. 1A schematically shows a cloud-based system architecture according to a non-limiting embodiment of the present invention. The architecture may include client devices 120n (where 1≤n≤N and where N represents the number of users participating in the video game) connected to an information processing apparatus, such as a server system 100, over a data network such as the Internet 130. It should be appreciated that N, the number of client devices in the cloud-based system architecture, is not particularly limited.

The server system provides 100 a virtual space in which a plurality of client device users can simultaneously participate. In some cases, this virtual space may represent a video game, while in other cases it may provide a visual effect that is used as a tool for supporting communication or improving user experiences for communication. Each user can operate and move within the space a corresponding avatar which is positioned in the virtual space. When a user operates an avatar in the virtual space, a screen for a viewpoint set in the space is provided to the client device of the user. The viewpoint may be selected from among preset fixed viewpoints, or may be selectively changeable by the user, or be something that is changed in accordance with movement (rotation) operation on the avatar by the user.

The configuration of the client devices 120n (1≤n≤N) is not particularly limited. In some embodiments, one or more of the client devices 120n (1≤n≤N) may be embodied in a personal computer (PC), a home game machine (console), a portable game machine, a smart television, a set-top box (STB), etc. In other embodiments, one or more of the client devices 120n (1≤n≤N) may be a communication or computing device such as a mobile phone, a personal digital assistant (PDA), or a tablet.

Each of the client devices 120n (1≤n≤N) may connect to the Internet 130 in any suitable manner, including over a respective local access network (not shown). The server system 100 may also connect to the Internet 130 over a local access network (not shown), although the server system 100 may connect directly to the Internet 130 without the intermediary of a local access network. Connections between the cloud gaming server system 100 and one or more of the client devices 120n (1≤n≤N) may comprise one or more channels. These channels can be made up of physical and/or logical links, and may travel over a variety of physical media, including radio frequency, fiber optic, free-space optical, coaxial and twisted pair. The channels may abide by a protocol such as UDP or TCP/IP. Also, one or more of the channels may be supported a virtual private network (VPN). In some embodiments, one or more of the connections may be session-based.

The server system 100 may enable users of the client devices 120n (1≤n≤N) to play video games, either individually (i.e., a single-player video game) or in groups (i.e., a multi-player video game). The server system 100 may also enable users of the client devices 120n (1≤n≤N) to spectate games being played by other players. Non-limiting examples of video games may include games that are played for leisure, education and/or sport. A video game may but need not offer users the possibility of monetary gain.

The server system 100 may also enable users of the client devices 120n (1≤n≤N) to test video games and/or administer the server system 100.

The server system 100 may include one or more computing resources, possibly including one or more game servers, and may comprise or have access to one or more databases, possibly including a user database 10. The user database 10 may store account information about various users and client devices 120n (1≤n≤N), such as identification data, financial data, location data, demographic data, connection data and the like. The game server(s) may be embodied in common hardware or they may be different servers that are connected via a communication link, including possibly over the Internet 130. Similarly, the database(s) may be embodied within the server system 100 or they may be connected thereto via a communication link, possibly over the Internet 130.

The server system 100 may execute computer-readable instructions that define an administrative application or portal. When its computer-readable instructions are executing, the administrative application handles interaction with client devices 120n (1≤n≤N) outside the game environment, such as prior to game play. For example, the administrative application may be configured for registering a user of one of the client devices 120n (1≤n≤N) in a user class (such as a "player", "spectator", "administrator" or "tester"), tracking the user's connectivity over the Internet, and responding to the user's command(s) to launch, join, exit or terminate an instance of a game, among several non-limiting functions. To this end, the administrative application may need to access the user database 10.

The administrative application may interact differently with users in different user classes, which may include "player", "spectator", "administrator" and "tester", to name a few non-limiting possibilities. Thus, for example, the administrative application may interface with a player (i.e., a user in the "player" user class) to allow the player to set up an account in the user database 10 and select a video game to play. Pursuant to this selection, the administrative application may invoke a server-side video game application. The server-side video game application may be defined by computer-readable instructions that execute a set of modules for the player, allowing the player to control a character, avatar, race car, cockpit, etc. within a virtual world of a video game. In the case of a multi-player video game, the virtual world may be shared by two or more players, and one player's game play may affect that of another. In another example, the administrative application may interface with a spectator (i.e., a user in the "spectator" user class) to allow the spectator to set up an account in the user database 10 and select a video game from a list of ongoing video games that the user may wish to spectate. Pursuant to this selection, the administrative application may invoke a set of modules for that spectator, allowing the spectator to observe game play of other users but not to control active characters in the game. (Unless otherwise indicated, where the term "user" is employed, it is meant to apply equally to both the "player" user class and the "spectator" user class.)

In a further example, the administrative application may interface with an administrator (i.e., a user in the "administrator" user class) to allow the administrator to change various features of the administrative application itself, perform updates and manage player/spectator accounts.

In yet another example, the administrative application may interface with a tester (i.e., a user in the "tester" user class) to allow the tester to select a video game to test.

Pursuant to this selection, the administrative application may invoke a set of modules for the tester, allowing the tester to test the video game.

Figure 1B:
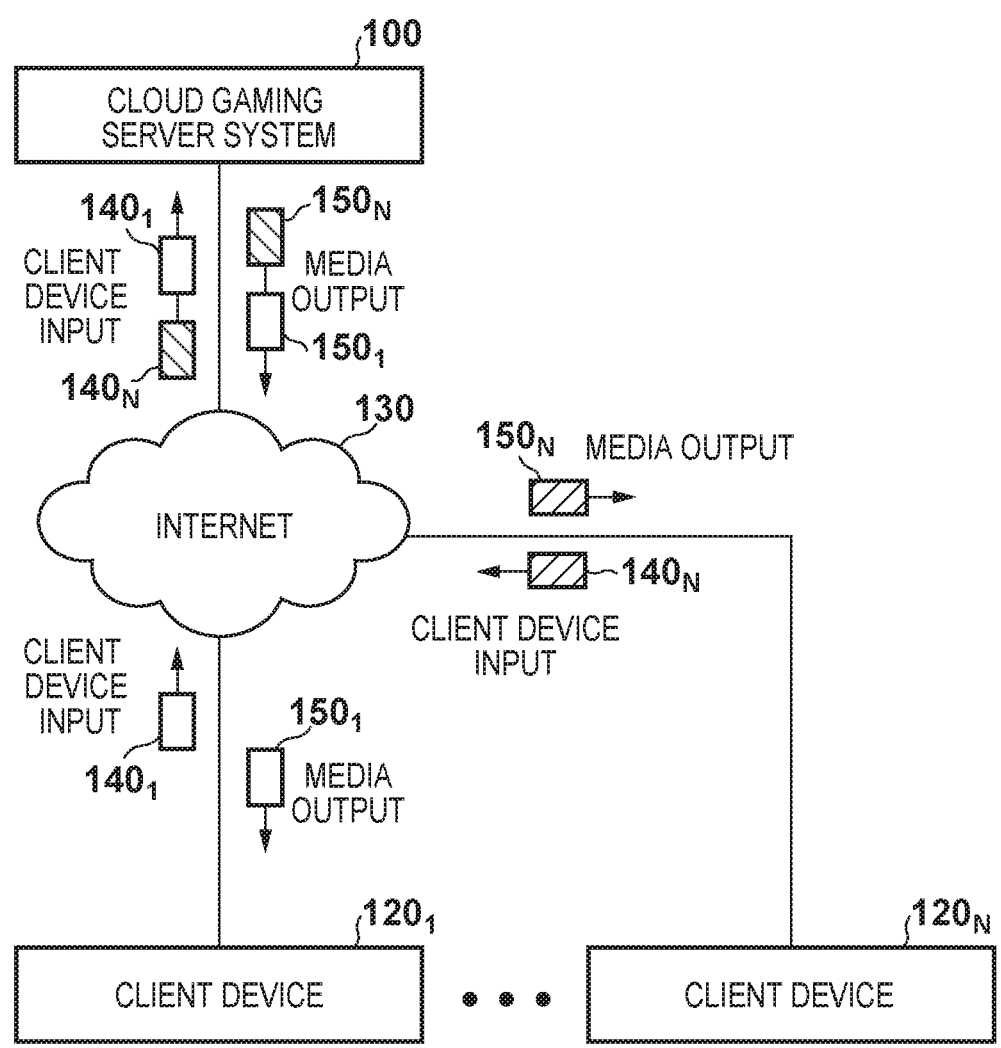
FIG. 1B is a block diagram of the cloud-based video game system architecture of FIG. 1A, showing interaction with the set of client devices over the data network during game play, according to a non-limiting embodiment of the present invention.

FIG. 1B illustrates interaction that may take place between client devices $120n$ ($1 \le n \le N$) and the server system 100 during game play, for users in the "player" or "spectator" user class.

In some non-limiting embodiments, the server-side video game application may cooperate with a client-side video game application, which can be defined by a set of computer-readable instructions executing on a client device, such as client device $120n$ ($1 \le n \le N$). Use of a client-side video game application may provide a customized interface for the user to play or spectate the game and access game features. In other non-limiting embodiments, the client device does not feature a client-side video game application that is directly executable by the client device. Rather, a web browser may be used as the interface from the client device's perspective. The web browser may itself instantiate a client-side video game application within its own software environment so as to optimize interaction with the server-side video game application.

The client-side video game application running (either independently or within a browser) on the given client device may translate received user inputs and detected user movements into "client device input", which may be sent to the cloud gaming server system 100 over the Internet 130.

In the illustrated embodiment of FIG. 1B, client devices $120n$ ($1 \le n \le N$) may produce client device input $140n$ ($1 \le n \le N$), respectively. The server system 100 may process the client device input $140n$ ($1 \le n \le N$) received from the various client devices $120n$ ($1 \le n \le N$) and may generate respective "media output" $150n$ ($1 \le n \le N$) for the various client devices $120n$ ($1 \le n \le N$). The media output $150n$ ($1 \le n \le N$) may include a stream of encoded video data (representing images when displayed on a screen) and audio data (representing sound when played via a loudspeaker). The media output $150n$ ($1 \le n \le N$) may be sent over the Internet 130 in the form of packets. Packets destined for a particular one of the client devices $120n$ ($1 \le n \le N$) may be addressed in such a way as to be routed to that device over the Internet 130. Each of the client devices $120n$ ($1 \le n \le N$) may include circuitry for buffering and processing the media output in the packets received from the cloud gaming server system 100, as well as a display for displaying images and a transducer (e.g., a loudspeaker) for outputting audio. Additional output devices may also be provided, such as an electro-mechanical system to induce motion.

It should be appreciated that a stream of video data can be divided into "frames". The term "frame" as used herein does not require the existence of a one-to-one correspondence between frames of video data and images represented by the video data. That is to say, while it is possible for a frame of video data to contain data representing a respective displayed image in its entirety, it is also possible for a frame of video data to contain data representing only part of an image, and for the image to in fact require two or more frames in order to be properly reconstructed and displayed. By the same token, a frame of video data may contain data representing more than one complete image, such that N images may be represented using M frames of video data, where M<N.

I. Cloud Gaming Server System 100 (Distributed Architecture)

Figure 2A:
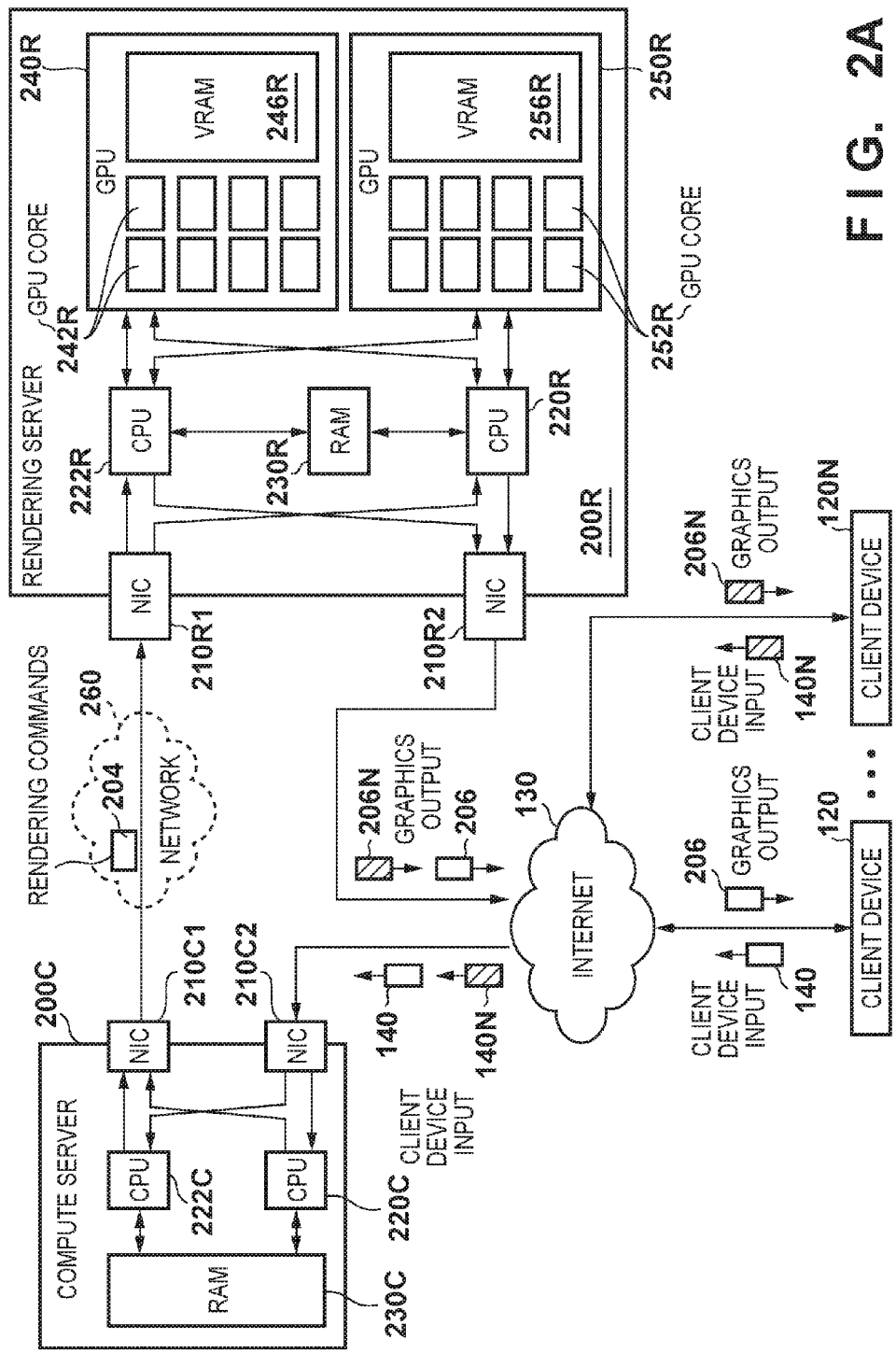
FIG. 2A is a block diagram showing various physical components of the architecture of FIG. 1, according to a non-limiting embodiment of the present invention.

FIG. 2A shows one possible non-limiting physical arrangement of components for the cloud gaming server system 100. In this embodiment, individual servers within the cloud gaming server system 100 may be configured to carry out specialized functions. For example, a compute server 200C may be primarily responsible for tracking state changes in a video game based on user input, while a rendering server 200R may be primarily responsible for rendering graphics (video data).

The users of client devices $120n$ ($1 \le n \le N$) may be players or spectators. It should be understood that in some cases there may be a single player and no spectator, while in other cases there may be multiple players and a single spectator, in still other cases there may be a single player and multiple spectators and in yet other cases there may be multiple players and multiple spectators.

For the sake of simplicity, the following description refers to a single compute server 200C connected to a single rendering server 200R. However, it should be appreciated that there may be more than one rendering server 200R connected to the same compute server 200C, or more than one compute server 200C connected to the same rendering server 200R. In the case where there are multiple rendering servers 200R, these may be distributed over any suitable geographic area.

As shown in the non-limiting physical arrangement of components in FIG. 2A, the compute server 200C may comprise one or more central processing units (CPUs) 220C, 222C and a random access memory (RAM) 230C. The CPUs 220C, 222C can have access to the RAM 230C over a communication bus architecture, for example. While only two CPUs 220C, 222C are shown, it should be appreciated that a greater number of CPUs, or only a single CPU, may be provided in some example implementations of the compute server 200C. The compute server 200C may also comprise a receiver for receiving client device input over the Internet 130 from each of the client devices participating in the video game. In the presently described example embodiment, client devices $120n$ ($1 \le n \le N$) are assumed to be participating in the video game, and therefore the received client device input may include client device input $140n$ ($1 \le n \le N$). In a non-limiting embodiment, the receiver may be implemented by a network interface component (NIC) 210C2.

The compute server 200C may further comprise transmitter for outputting sets of rendering commands $204m$, where $1 \le m \le M$. In a non-limiting embodiment, M represents the number of users (or client devices), but this need not be the case in every embodiment, particularly where a single set of rendering commands is shared among multiple users. Thus, M simply represents the number of generated sets of rendering commands. The sets of rendering commands $204m$ ($1 \le m \le M$) output from the compute server 200C may be sent to the rendering server 200R. In a non-limiting embodiment, the transmitter may be embodied by a network interface component (NIC) 210C1. In one embodiment, the compute server 200C may be connected directly to the rendering server 200R. In another embodiment, the compute server 200C may be connected to the rendering server 200R over a network 260, which may be the Internet 130 or another network. A virtual private network (VPN) may be established between the compute server 200C and the rendering server 200R over the network 260.

At the rendering server 200R, the sets of rendering commands $204m$ ($1 \le m \le M$) sent by the compute server 200C may be received at a receiver (which may be implemented by a network interface component (NIC) 210R1) and may be directed to one or more CPUs 220R, 222R. The CPUs 220R, 222R may be connected to graphics processing units (GPUs) 240R, 250R. By way of non-limiting example, GPU 240R may include a set of GPU cores 242R and a video random access memory (VRAM) 246R. Similarly, GPU 250R may include a set of GPU cores 252R and a video random access memory (VRAM) 256R. Each of the CPUs 220R, 222R may be connected to each of the GPUs 240R, 250R or to a subset of the GPUs 240R, 250R. Communication between the CPUs 220R, 222R and the GPUs 240R, 250R can be established using, for example, a communication bus architecture. Although only two CPUs and two GPUs are shown, there may be more than two CPUs and GPUs, or even just a single CPU or GPU, in a specific example of implementation of the rendering server 200R.

The CPUs 220R, 222R may cooperate with the GPUs 240R, 250R to convert the sets of rendering commands 204m (1≤m≤M) into graphics output streams 206n, where 1≤n≤N and where N represents the number of users (or client devices) participating in the video game. Specifically, there may be N graphics output streams 206n (1≤n≤N) for the client devices 120n (1≤n≤N), respectively. This will be described in further detail later on. The rendering server 200R may comprise a further transmitter (which may be implemented by a network interface component (NIC) 210R2), through which the graphics output streams 206n (1≤n≤N) may be sent to the client devices 120n (1≤n≤N), respectively.

II. Cloud Gaming Server System 100 (Hybrid Architecture)

Figure 2B:
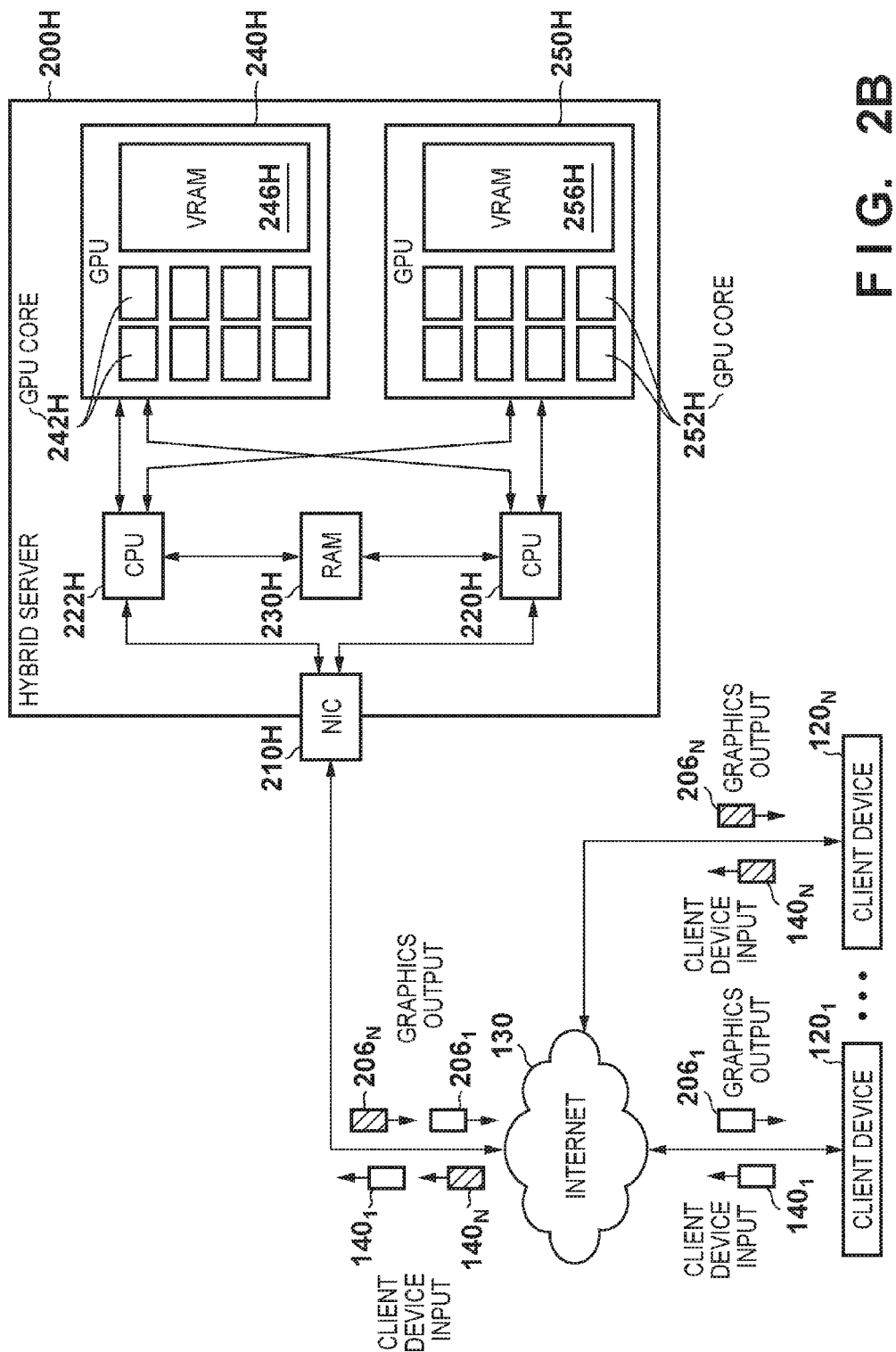
FIG. 2B is a variant of FIG. 2A.

FIG. 2B shows a second possible non-limiting physical arrangement of components for the cloud gaming server system 100. In this embodiment, a hybrid server 200H may be responsible both for tracking state changes in a video game based on user input, and for rendering graphics (video data).

As shown in the non-limiting physical arrangement of components in FIG. 2B, the hybrid server 200H may comprise one or more central processing units (CPUs) 220H, 222H and a random access memory (RAM) 230H. The CPUs 220H, 222H may have access to the RAM 230H over a communication bus architecture, for example. While only two CPUs 220H, 222H are shown, it should be appreciated that a greater number of CPUs, or only a single CPU, may be provided in some example implementations of the hybrid server 200H. The hybrid server 200H may also comprise a receiver for receiving client device input is received over the Internet 130 from each of the client devices participating in the video game. In the presently described example embodiment, client devices 120n (1≤n≤N) are assumed to be participating in the video game, and therefore the received client device input may include client device input 140n (1≤n≤N). In a non-limiting embodiment, the receiver may be implemented by a network interface component (NIC) 210H.

In addition, the CPUs 220H, 222H may be connected to a graphics processing units (GPUs) 240H, 250H. By way of non-limiting example, GPU 240H may include a set of GPU cores 242H and a video random access memory (VRAM) 246H. Similarly, GPU 250H may include a set of GPU cores 252H and a video random access memory (VRAM) 256H. Each of the CPUs 220H, 222H may be connected to each of the GPUs 240H, 250H or to a subset of the GPUs 240H, 250H. Communication between the CPUs 220H, 222H and the GPUs 240H, 250H may be established using, for example, a communication bus architecture. Although only two CPUs and two GPUs are shown, there may be more than two CPUs and GPUs, or even just a single CPU or GPU, in a specific example of implementation of the hybrid server 200H.

The CPUs 220H, 222H may cooperate with the GPUs 240H, 250H to convert the sets of rendering commands 204m (1≤m≤M) into graphics output streams 206n (1≤n≤N). Specifically, there may be N graphics output streams 206n (1≤n≤N) for the participating client devices 120n (1≤n≤N), respectively. The graphics output streams 206n (1≤n≤N) may be sent to the client devices 120n (1≤n≤N), respectively, via a transmitter which, in a non-limiting embodiment, may be implemented at least in part by the NIC 210H.

III. Cloud Gaming Server System 100 (Functionality Overview)

Figure 2C:
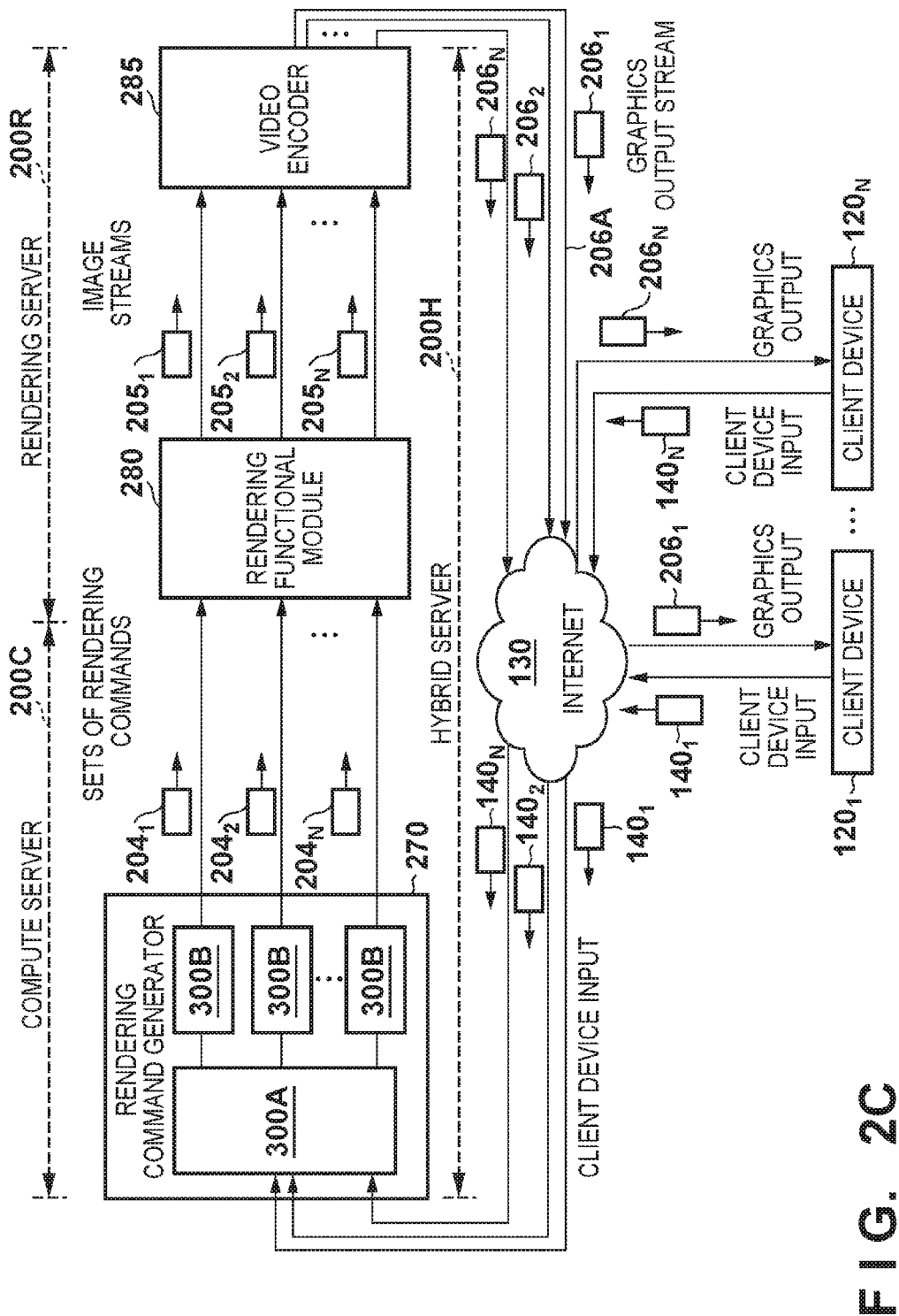
FIG. 2C is a block diagram showing various modules of the server system in the architecture of FIG. 1, which can be implemented by the physical components of FIG. 2A or 2B and which may be operational during game play.

During game play, the server system 100 runs a server-side video game application, which can be composed of a set of modules. With reference to FIG. 2C, these modules may include a rendering command generator 270, a rendering functional module 280 and a video encoder 285. These modules may be implemented by the above-described physical components of the compute server 200C and the rendering server 200R (in FIG. 2A) and/or of the hybrid server 200H (in FIG. 2B). For example, according to the non-limiting embodiment of FIG. 2A, the rendering command generator 270 may be implemented by the compute server 200C, while the rendering functional module 280 and the video encoder 285 may be implemented by the rendering server 200R. According to the non-limiting embodiment of FIG. 2B, the hybrid server 200H may implement the rendering command generator 270, the rendering functional module 280 and the video encoder 285.

The present example embodiment discusses a single rendering command generator 270 for simplicity of illustration. However, it should be noted that in an actual implementation of the cloud gaming server system 100, many rendering command generators similar to the rendering command generator 270 may be executed in parallel. Thus, the cloud gaming server system 100 may support multiple independent instantiations of the same video game, or multiple different video games, simultaneously. Also, it should be noted that the video games can be single-player video games or multi-player games of any type.

The rendering command generator 270 may be implemented by certain physical components of the compute server 200C (in FIG. 2A) or of the hybrid server 200H (in FIG. 2B). Specifically, the rendering command generator 270 may be encoded as computer-readable instructions that are executable by a CPU (such as the CPUs 220C, 222C in the compute server 200C or the CPUs 220H, 222H in the hybrid server 200H). The instructions can be tangibly stored in the RAM 230C (in the compute server 200C) of the RAM 230H (in the hybrid server 200H) or in another memory area, together with constants, variables and/or other data used by the rendering command generator 270. In some embodiments, the rendering command generator 270 may be executed within the environment of a virtual machine that may be supported by an operating system that is also being executed by a CPU (such as the CPUs 220C, 222C in the compute server 200C or the CPUs 220H, 222H in the hybrid server 200H).

The rendering functional module 280 may be implemented by certain physical components of the rendering server 200R (in FIG. 2A) or of the hybrid server 200H (in FIG. 2B). In an embodiment, the rendering functional module 280 may take up one or more GPUs (240R, 250R in FIG. 2A, 240H, 250H in FIG. 2B) and may or may not utilize CPU resources.

The video encoder 285 may be implemented by certain physical components of the rendering server 200R (in FIG. 2A) or of the hybrid server 200H (in FIG. 2B). Those skilled in the art will appreciate that there are various ways in which to implement the video encoder 285. In the embodiment of FIG. 2A, the video encoder 285 may be implemented by the CPUs 220R, 222R and/or by the GPUs 240R, 250R. In the embodiment of FIG. 2B, the video encoder 285 may be implemented by the CPUs 220H, 222H and/or by the GPUs 240H, 250H. In yet another embodiment, the video encoder 285 may be implemented by a separate encoder chip (not shown).

In operation, the rendering command generator 270 may produce the sets of rendering commands 204$m$ (1≤m≤M), based on received client device input 140$n$ (1≤n≤N). The received client device input may carry data (e.g., an address) identifying the rendering command generator 270 for which it is destined, and/or possibly data identifying the user and/or client device from which it originates.

Rendering commands refer to commands which may be used to instruct a specialized graphics processing unit (GPU) to produce a frame of video data or a sequence of frames of video data. Referring to FIG. 2C, the sets of rendering commands 204$m$ (1≤m≤M) result in the production of frames of video data by the rendering functional module 280. The images represented by these frames may change as a function of responses to the client device input 140$n$ (1≤n≤N) that are programmed into the rendering command generator 270. For example, the rendering command generator 270 may be programmed in such a way as to respond to certain specific stimuli to provide the user with an experience of progression (with future interaction being made different, more challenging or more exciting), while the response to certain other specific stimuli will provide the user with an experience of regression or termination. Although the instructions for the rendering command generator 270 may be fixed in the form of a binary executable file, the client device input 140$n$ (1≤n≤N) is unknown until the moment of interaction with a player who uses the corresponding client device 120$n$ (1≤n≤N). As a result, there can be a wide variety of possible outcomes, depending on the specific client device input that is provided. This interaction between players/spectators and the rendering command generator 270 via the client devices 120$n$ (1≤n≤N) can be referred to as "game play" or "playing a video game".

The rendering functional module 280 may process the sets of rendering commands 204$m$ (1≤m≤M) to create multiple video data streams 205$n$ (1≤n≤N, where N refers to the number of users/client devices participating in the video game). Thus, there may generally be one video data stream created per user (or, equivalently, per client device). When performing rendering, data for one or more objects represented in three-dimensional space (e.g., physical objects) or two-dimensional space (e.g., text) may be loaded into a cache memory (not shown) of a particular GPU 240R, 250R, 240H, 250H. This data may be transformed by the GPU 240R, 250R, 240H, 250H into data representative of a two-dimensional image, which may be stored in the appropriate VRAM 246R, 256R, 246H, 256H. As such, the VRAM 246R, 256R, 246H, 256H may provide temporary storage of picture element (pixel) values for a game screen.

The video encoder 285 may compress and encodes the video data in each of the video data streams 205$n$ (1≤n≤N) into a corresponding stream of compressed/encoded video data. The resultant streams of compressed/encoded video data, referred to as graphics output streams, may be produced on a per-client-device basis. In the present example embodiment, the video encoder 285 may produce graphics output streams 206$n$ (1≤n≤N) for client devices 120$n$ (1≤n≤N), respectively. Additional modules may be provided for formatting the video data into packets so that they can be transmitted over the Internet 130. The video data in the video data streams 205$n$ (1≤n≤N) and the compressed/encoded video data within a given graphics output stream may be divided into frames.

IV. Generation of Rendering Commands

Figure 3A:
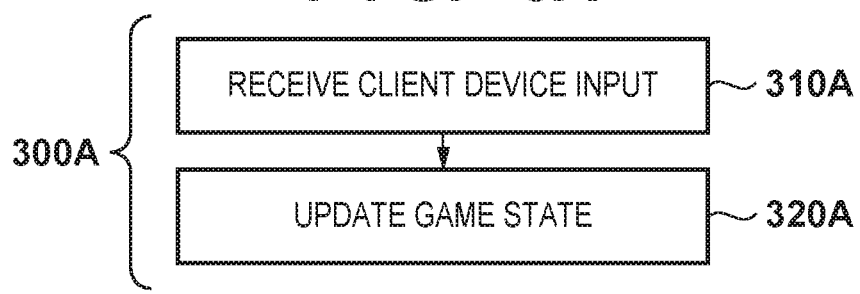
FIGS. 3A to 3C are flowcharts showing execution of a set of video game processes carried out by a rendering command generator, in accordance with non-limiting embodiments of the present invention.
Figure 3B:
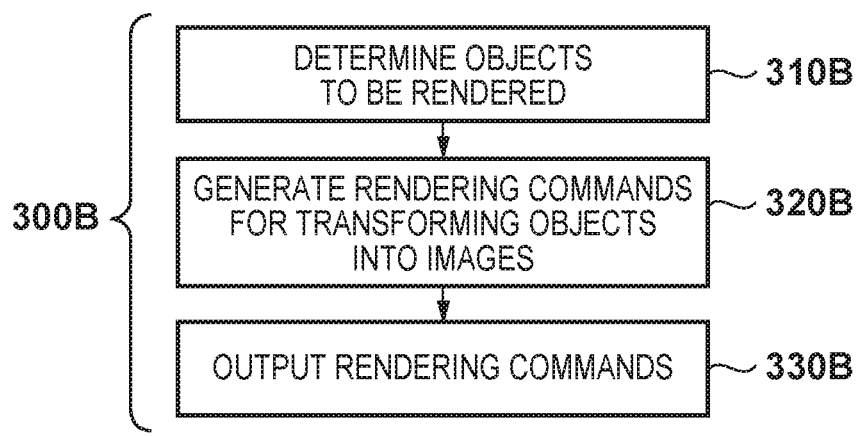

Generation of rendering commands by the rendering command generator 270 is now described in greater detail with reference to FIGS. 2C, 3A and 3B. Specifically, execution of the rendering command generator 270 may involve several processes, including a main game process 300A and a graphics control process 300B, which are described herein below in greater detail.

Main Game Process

The main game process 300A is described with reference to FIG. 3A. The main game process 300A may execute repeatedly as a continuous loop. As part of the main game process 300A, there may be provided an action 310A, during which client device input may be received. If the video game is a single-player video game without the possibility of spectating, then client device input (e.g., client device input 140$1$) from a single client device (e.g., client device 120$1$) is received as part of action 310A. If the video game is a multi-player video game or is a single-player video game with the possibility of spectating, then the client device input from one or more client devices may be received as part of action 310A.

By way of non-limiting example, the input from a given client device may convey that the user of the given client device wishes to cause a character under his or her control to move, jump, kick, turn, swing, pull, grab, etc. Alternatively or in addition, the input from the given client device may convey a menu selection made by the user of the given client device in order to change one or more audio, video or gameplay settings, to load/save a game or to create or join a network session. Alternatively or in addition, the input from the given client device may convey that the user of the given client device wishes to select a particular camera view (e.g., first-person or third-person) or reposition his or her viewpoint within the virtual world.

At action 320A, the game state may be updated based at least in part on the client device input received at action 310A and other parameters. Updating the game state may involve the following actions:

Firstly, updating the game state may involve updating certain properties of the user (player or spectator) associated with the client devices from which the client device input may have been received. These properties may be stored in the user database 10. Examples of user properties that may be maintained in the user database 10 and updated at action 320A can include a camera view selection (e.g., 1st person, 3rd person), a mode of play, a selected audio or video setting, a skill level, a customer grade (e.g., guest, premium, etc.).

Secondly, updating the game state may involve updating the attributes of certain objects in the virtual world based on an interpretation of the client device input. The objects whose attributes are to be updated may in some cases be represented by two- or three-dimensional models and may include playing characters, non-playing characters and other objects. In the case of a playing character, attributes that can be updated may include the object's position, strength, weapons/armor, lifetime left, special powers, speed/direction (velocity), animation, visual effects, energy, ammunition, etc. In the case of other objects (such as background, vegetation, buildings, vehicles, score board, etc.), attributes that can be updated may include the object's position, velocity, animation, damage/health, visual effects, textual content, etc.

It should be appreciated that parameters other than client device input may influence the above properties (of users) and attributes (of virtual world objects). For example, various timers (such as elapsed time, time since a particular event, virtual time of day, total number of players, a user's geographic location, etc.) can have an effect on various aspects of the game state.

Once the game state has been updated further to execution of action 320A, the main game process 300A may return to action 310A, whereupon new client device input received since the last pass through the main game process is gathered and processed.

Graphics Control Process

A second process, referred to as the graphics control process, is now described with reference to FIG. 3B. Although shown as separate from the main game process 300A, the graphics control process 300B may execute as an extension of the main game process 300A. The graphics control process 300B may execute continually resulting in generation of the sets of rendering commands 204$m$ ($1 \leq m \leq M$). In the case of a single-player video game without the possibility of spectating, there is only one user (i.e., N=1) and therefore only one resulting set of rendering commands 2041 (i.e., M=1) to be generated. In other cases, N (the number of users) is greater than 1. For example, in the case of a multi-player video game, multiple distinct sets of rendering commands (M>1) need to be generated for the multiple players, and therefore multiple sub-processes may execute in parallel, one for each player. On the other hand, in the case of a single-player game with the possibility of spectating (again, multiple users and therefore N>1), there may be only a single set of rendering commands 2041 (M=1), with the resulting video data stream being duplicated for the spectators by the rendering functional module 280. Of course, these are only examples of implementation and are not to be taken as limiting.

Consider operation of the graphics control process 300B for a given user requiring one of the video data streams 205$n$ ($1 \leq n \leq N$). At action 310B, the rendering command generator 270 may determine the objects to be rendered for the given user. This action may include identifying the following types of objects:

Firstly, this action may include identifying those objects from the virtual world that are in the "game screen rendering range" (also known as a "scene") for the given user. The game screen rendering range may include a portion of the virtual world that would be "visible" from the perspective of the given user's camera. This may depend on the position and orientation of that camera relative to the objects in the virtual world. In a non-limiting example of implementation of action 310B, a frustum may be applied to the virtual world, and the objects within that frustum are retained or marked. The frustum has an apex which may be situated at the location of the given user's camera and may have a directionality also defined by the directionality of that camera.

Secondly, this action can include identifying additional objects that do not appear in the virtual world, but which nevertheless may need to be rendered for the given user. For example, these additional objects may include textual messages, graphical warnings and dashboard indicators, to name a few non-limiting possibilities.

At action 320B, the rendering command generator 270 may generate a set of commands 204$m$ ($1 \leq m \leq M$) for rendering into graphics (video data) the objects that were identified at action 310B. Rendering may refer to the transformation of 3-D or 2-D coordinates of an object or group of objects into data representative of a displayable image, in accordance with the viewing perspective and prevailing lighting conditions. This may be achieved using any number of different algorithms and techniques, for example as described in "Computer Graphics and Geometric Modelling: Implementation & Algorithms", Max K. Agoston, Springer-Verlag London Limited, 2005, hereby incorporated by reference herein. The rendering commands may have a format that in conformance with a 3D application programming interface (API) such as, without limitation, "Direct3D" from Microsoft Corporation, Redmond, Wash., and "OpenGL" managed by Khronos Group, Beaverton, Oreg.

At action 330B, the rendering commands generated at action 320B may be output to the rendering functional module 280. This may involve packetizing the generated rendering commands into a set of rendering commands 204$m$ ($1 \leq m \leq M$) that is sent to the rendering functional module 280.

V. Generation of Graphics Output

The rendering functional module 280 may interpret the sets of rendering commands 204$m$ ($1 \leq m \leq M$) and produce multiple video data streams 205$n$ ($1 \leq n \leq N$), one for each of the N participating client devices 120$n$ ($1 \leq n \leq N$). Rendering may be achieved by the GPUs 240R, 250R, 240H, 250H under control of the CPUs 220R, 222R (in FIG. 2A) or 220H, 222H (in FIG. 2B). The rate at which frames of video data are produced for a participating client device may be referred to as the frame rate.

In an embodiment where there are N users, the N video data streams 205$n$ ($1 \leq n \leq N$) may be created from respective sets of rendering commands 204$m$ ($1 \leq m \leq M$, where M=N). In that case, rendering functionality is not shared among the users. However, the N video data streams 205$n$ ($1 \leq n \leq N$) may also be created from M sets of rendering commands 204$m$) ($1 \leq m \leq M$, where M is less than N), such that fewer sets of rendering commands need to be processed by the rendering functional module 280. In that case, the rendering functional module 280 may perform sharing or duplication in order to generate a larger number of video data streams 205$n$ ($1 \leq n \leq N$) from a smaller number of sets of rendering commands 204$m$ ($1 \leq m \leq M$, where M<N). Such sharing or duplication may be prevalent when multiple users (e.g., spectators) desire to view the same camera perspective. Thus, the rendering functional module 280 may perform functions such as duplicating a created video data stream for one or more spectators.

Next, the video data in each of the video data streams 205$n$ ($1 \leq n \leq N$) may be encoded by the video encoder 285, resulting in a sequence of encoded video data associated with each client device, referred to as a graphics output stream. In the example embodiments of FIGS. 2A-2C, the sequence of encoded video data destined for each of the client devices 120$n$ ($1 \leq n \leq N$) is referred to as graphics output stream 206$n$ ($1 \leq n \leq N$).

The video encoder 285 may be a device (or set of computer-readable instructions) that enables or carries out or defines a video compression or decompression algorithm for digital video. Video compression may transform an original stream of digital image data (expressed in terms of pixel locations, color values, etc.) into an output stream of digital image data that conveys substantially the same information but using fewer bits. Any suitable compression algorithm may be used. In addition to data compression, the encoding process used to encode a particular frame of video data may or may not involve cryptographic encryption.

The graphics output streams $206n$ ($1 \leq n \leq N$) created in the above manner may be sent over the Internet 130 to the respective client devices. By way of non-limiting example, the graphics output streams may be segmented and formatted into packets, each having a header and a payload. The header of a packet containing video data for a given user may include a network address of the client device associated with the given user, while the payload may include the video data, in whole or in part. In a non-limiting embodiment, the identity and/or version of the compression algorithm used to encode certain video data may be encoded in the content of one or more packets that convey that video data. Other methods of transmitting the encoded video data may occur to those of skill in the art.

While the present description focuses on the rendering of video data representative of individual 2-D images, the present invention does not exclude the possibility of rendering video data representative of multiple 2-D images per frame to create a 3-D effect.

VI. Game Screen Reproduction at Client Device

Reference is now made to FIG. 4A, which shows operation of a client-side video game application that may be executed by the client device associated with a given user, which may be any of the client devices $120n$ ($1 \leq n \leq N$), by way of non-limiting example. In operation, the client-side video game application may be executable directly by the client device or it may run within a web browser, to name a few non-limiting possibilities.

At action 410A, a graphics output stream (from among the graphics output streams $206n$ ($1 \leq n \leq N$)) may be received over the Internet 130 from the rendering server 200R (FIG. 2A) or from the hybrid server 200H (FIG. 2B), depending on the embodiment. The received graphics output stream may comprise compressed/encoded of video data which may be divided into frames.

At action 420A, the compressed/encoded frames of video data may be decoded/decompressed in accordance with the decompression algorithm that is complementary to the encoding/compression algorithm used in the encoding/compression process. In a non-limiting embodiment, the identity or version of the encoding/compression algorithm used to encode/compress the video data may be known in advance. In other embodiments, the identity or version of the encoding/compression algorithm used to encode the video data may accompany the video data itself.

At action 430A, the (decoded/decompressed) frames of video data may be processed. This can include placing the decoded/decompressed frames of video data in a buffer, performing error correction, reordering and/or combining the data in multiple successive frames, alpha blending, interpolating portions of missing data, and so on. The result may be video data representative of a final image to be presented to the user on a per-frame basis.

At action 440A, the final image may be output via the output mechanism of the client device. For example, a composite video frame may be displayed on the display of the client device.

VII. Audio Generation

Figure 3C:
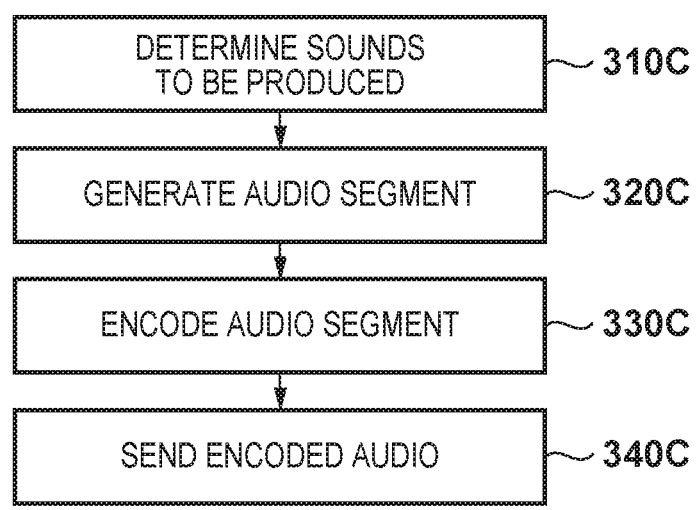

A third process, referred to as the audio generation process, is now described with reference to FIG. 3C. The audio generation process may execute continually for each user requiring a distinct audio stream. In one embodiment, the audio generation process may execute independently of the graphics control process 300B. In another embodiment, execution of the audio generation process and the graphics control process may be coordinated.

At action 310C, the rendering command generator 270 may determine the sounds to be produced. Specifically, this action may include identifying those sounds associated with objects in the virtual world that dominate the acoustic landscape, due to their volume (loudness) and/or proximity to the user within the virtual world.

At action 320C, the rendering command generator 270 may generate an audio segment. The duration of the audio segment may span the duration of a video frame, although in some embodiments, audio segments may be generated less frequently than video frames, while in other embodiments, audio segments may be generated more frequently than video frames.

At action 330C, the audio segment may be encoded, e.g., by an audio encoder, resulting in an encoded audio segment. The audio encoder can be a device (or set of instructions) that enables or carries out or defines an audio compression or decompression algorithm. Audio compression may transform an original stream of digital audio (expressed as a sound wave changing in amplitude and phase over time) into an output stream of digital audio data that conveys substantially the same information but using fewer bits. Any suitable compression algorithm may be used. In addition to audio compression, the encoding process used to encode a particular audio segment may or may not apply cryptographic encryption.

It should be appreciated that in some embodiments, the audio segments may be generated by specialized hardware (e.g., a sound card) in either the compute server 200C (FIG. 2A) or the hybrid server 200H (FIG. 2B). In an alternative embodiment that may be applicable to the distributed arrangement of FIG. 2A, the audio segment may be parametrized into speech parameters (e.g., LPC parameters) by the rendering command generator 270, and the speech parameters can be redistributed to the destination client device by the rendering server 200R.

The encoded audio created in the above manner is sent over the Internet 130. By way of non-limiting example, the encoded audio input may be broken down and formatted into packets, each having a header and a payload. The header may carry an address of a client device associated with the user for whom the audio generation process is being executed, while the payload may include the encoded audio. In a non-limiting embodiment, the identity and/or version of the compression algorithm used to encode a given audio segment may be encoded in the content of one or more packets that convey the given segment. Other methods of transmitting the encoded audio may occur to those of skill in the art.

Reference is now made to FIG. 4B, which shows operation of the client device associated with a given user, which may be any of client devices $120n$ ($1 \leq n \leq N$), by way of non-limiting example.

At action 410B, an encoded audio segment may be received from the compute server 200C, the rendering server 200R or the hybrid server 200H (depending on the embodiment). At action 420B, the encoded audio may be decoded in accordance with the decompression algorithm that is complementary to the compression algorithm used in the encoding process. In a non-limiting embodiment, the identity or version of the compression algorithm used to encode the audio segment may be specified in the content of one or more packets that convey the audio segment.

At action 430B, the (decoded) audio segments may be processed. This may include placing the decoded audio segments in a buffer, performing error correction, combining multiple successive waveforms, and so on. The result may be a final sound to be presented to the user on a per-frame basis.

At action 440B, the final generated sound may be output via the output mechanism of the client device. For example, the sound may be played through a sound card or loudspeaker of the client device.

VIII. Specific Description of Non-Limiting Embodiments

An exemplary embodiment of the present invention will be described below in detail with reference to the accompanying drawings. Note that in an embodiment to be described below, processing to be performed by a rendering server 200R will be exemplified for the sake of simplicity in association with the arrangement of a compute server 200C serving as a rendering command generator 270 that performs various kinds of calculations associated with a game content and sends a rendering command, and the rendering server 200R serving as a rendering functional module 280 that performs screen rendering processing based on the rendering command sent from the compute server 200C, as shown in FIG. 2A. That is, an example will be described below in which the present invention is applied to the rendering server 200R that performs screen rendering processing based on an acquired rendering command as an example of an information processing apparatus. However, the present invention is not limited to the arrangement as shown in FIG. 2A, and can also be applied to an arrangement that provides an entity (rendering command generator 270) for issuing a rendering command and an entity (rendering functional module 280) for rendering a screen are integrally provided in an apparatus as long as the rendering command is issued for hardware that performs screen rendering. That is, the present invention is applicable to any arbitrary device that acquires a rendering command by a certain method, and performs screen rendering processing based on the rendering command.

<<Arrangement of Rendering Server 200R>>

Figure 5:
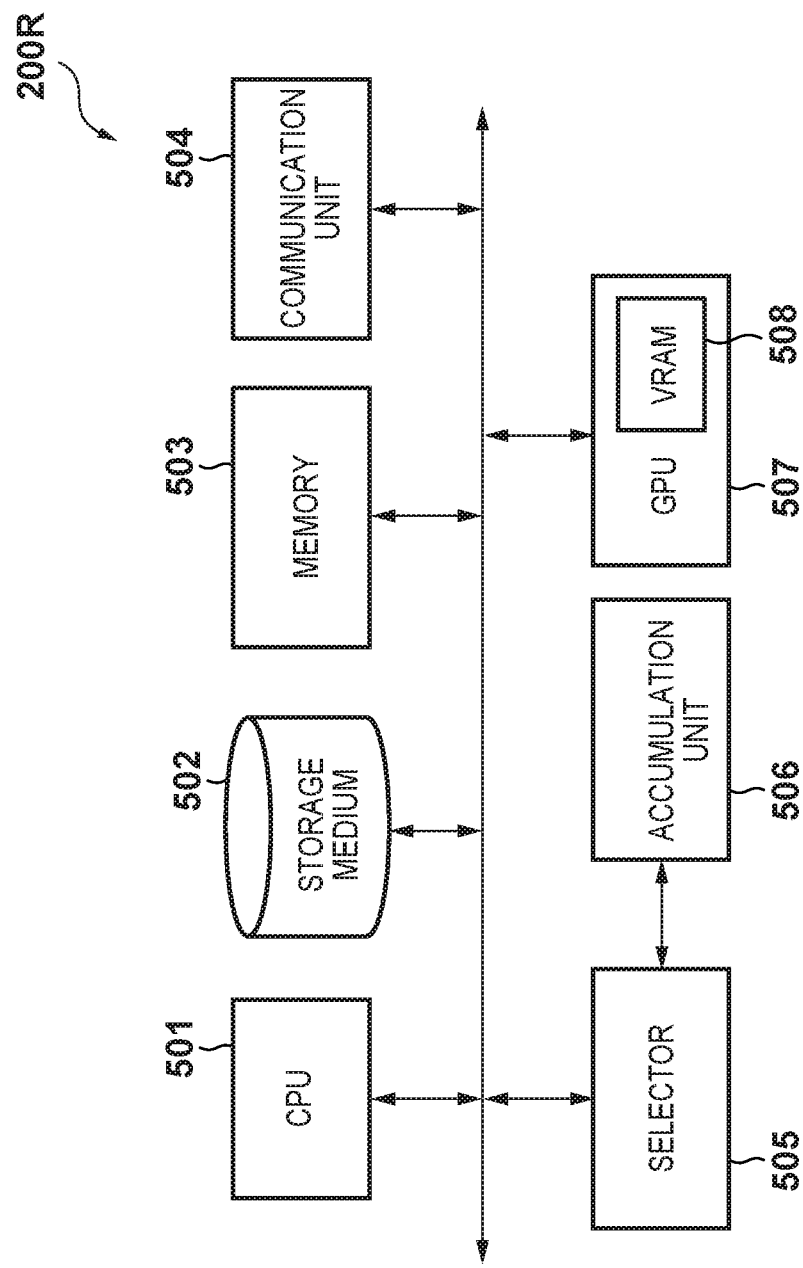
FIG. 5 is a block diagram simply showing the functional arrangement of a rendering server 200R according to at least one embodiment.

FIG. 5 is a block diagram showing the functional arrangement of the rendering server 200R according to the embodiment of the present invention. The outline of the rendering server 200R is the same as described above. FIG. 5 more simply and specifically illustrates the functional arrangement in the rendering server 200R which performs characteristic operations in this embodiment.

As shown in FIG. 5, in this embodiment, the rendering server 200R includes a plurality of functional components including components that replace those shown in FIG. 2A. In the relationship to FIG. 2A, a CPU 501 replaces the CPU 220R or 222R, a memory 503 replaces the RAM 230R, a GPU 507 replaces the GPU 240R or 250R, a VRAM 508 replaces the VRAM 246R or 256R, and a communication unit 504 replaces the NIC 210R1 or 210R2.

The communication unit 504 is a communication interface to an external apparatus of the rendering server 200R. In this embodiment, the communication unit 504 receives a rendering command and information used to specify the sending destination (client device 120) of a screen rendered based on the rendering command from the compute server 200C. The communication unit 504 also transmits screen data rendered based on the rendering command to the corresponding client device 120 as a graphics output 206.

A storage medium 502 is a storage device such as a nonvolatile memory or HDD that permanently stores data, unlike, for example, the memory 503. In this embodiment, a description will be made assuming that data (model data, texture data, rendering program, and the like) associated with various kinds of objects, which are necessary to render a screen, are stored in the storage medium 502 in advance. However, the present invention is not limited to this, and the data associated with various kinds of objects may be received from the compute server 200C and stored in the storage medium 502, or acquired from a specific external apparatus via the communication unit 504.

A selector 505 controls an operation of acquiring the rendering command and an operation of transmitting it to the transmission destination under the control of the CPU 501. When the rendering command is acquired via the communication unit 504, the selector 505 transmits the rendering command to the CPU 501 or GPU 507 serving as the rendering functional module 280. At this time, the selector 505 also transmits the rendering command to the accumulation unit 506. The accumulation unit 506 accumulates the rendering command issued by the compute server 200C in the chronological order in association with the issuance timing or reception timing and information for specifying the transmission destination of a corresponding screen. In other words, the accumulation unit 506 is a database that accumulates the log of issued rendering commands for each client device 120. On the other hand, when execution of a test mode is selected in the rendering server 200R, the communication unit 504 acquires no rendering command. For this reason, the selector 505 acquires the rendering command accumulated in the accumulation unit 506 in the chronological order and transmits it to the CPU 501 or GPU 507 serving as the rendering functional module 280. Note that in this embodiment, for the sake of simplicity, a description will be made assuming that when execution of a test mode is selected in the rendering server 200R, the communication unit 504 acquires no rendering command. However, the present invention is not limited to this. That is, it is to be understood that the test mode may be executed in parallel to service providing (screen providing) to the client device 120, and the communication unit 504 may acquire the rendering command even in the test mode. By providing the selector 505 and the accumulation unit 506 which thus operate, the rendering server 200R according to this embodiment can replicate the same rendering processing as that of a rendering command that has been executed once. That is, it is possible to replicate the situation in which the same rendering contents are performed, as described above. Hence, debug associated with processing concerning rendering can be done while, for example, fixing the rendering command.

<<Screen Rendering Processing>>

Figure 6:
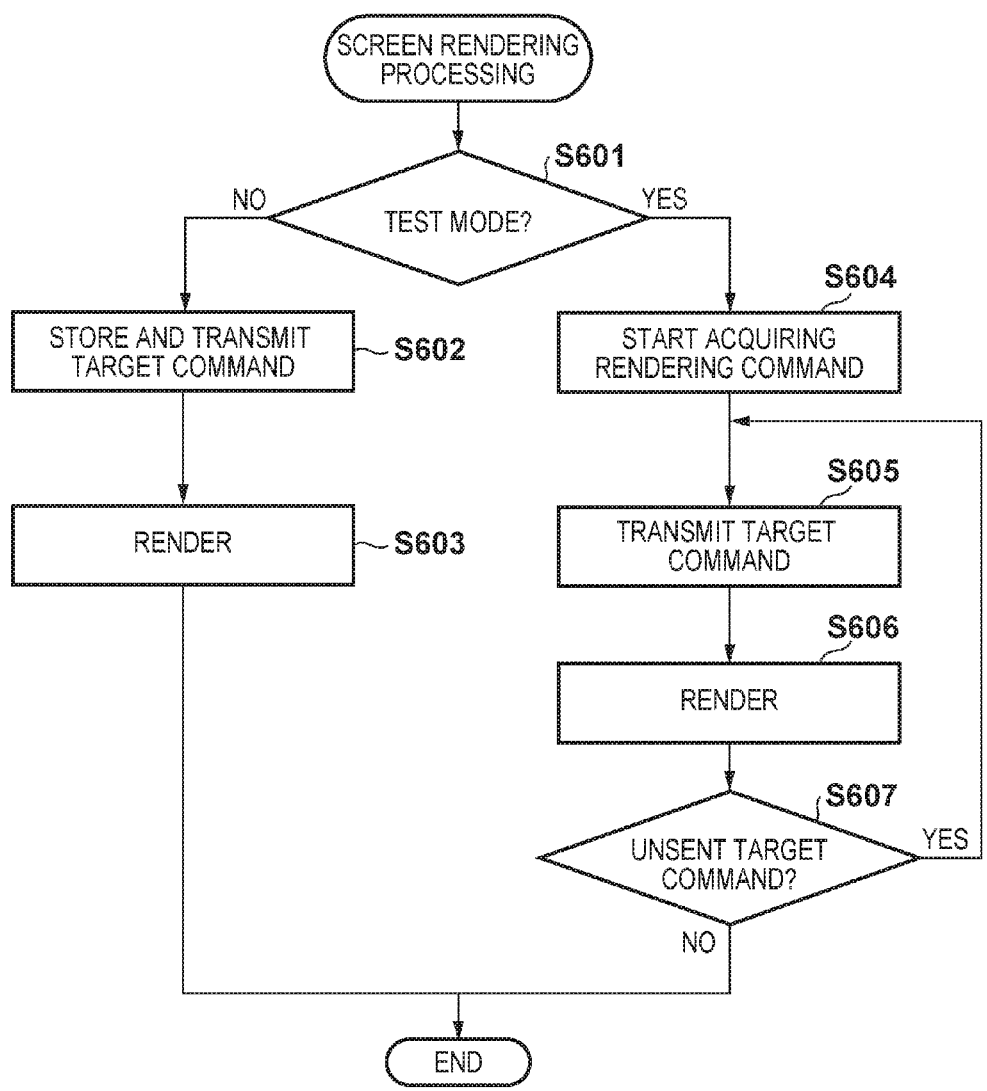
FIG. 6 is a flowchart illustrating image rendering processing executed by the rendering server 200R according to at least one embodiment.

Detailed screen rendering processing of the rendering server 200R according to this embodiment having the above-described arrangement will be described next with reference to the flowchart of FIG. 6. Processing corresponding to the flowchart can be implemented when the CPU 501 reads out a corresponding processing program stored in, for example, the storage medium 502, and loads and executes the program on the memory 503. Note that a description will be made assuming that the screen rendering processing starts when, for example, the communication unit 504 has received the rendering command, or the rendering server 200R is set in the test mode.

In step S601, the CPU 501 determines whether the rendering server 200R is currently set in the test mode. Upon determining that the rendering server 200R is set in the test mode, the CPU 501 advances the process to step S604. Upon determining that the rendering server 200R is not set in the test mode, the CPU 501 advances the process to step S602.

In step S602, the selector 505 transmits the rendering command (target command) received by the communication unit 504 to the rendering functional module 280, and also transmits the target command to the accumulation unit 506 in association with, for example, the reception timing and information for specifying the corresponding client device 120 (target device) and causes the accumulation unit 506 to store it under the control of the CPU 501.

In step S603, the rendering functional module 280 performs rendering processing of the screen to be transmitted to the target device based on the received target command by cooperation of the CPU 501 and the GPU 507. After completion of the rendering processing, for example, the GPU 507 outputs data associated with the rendered screen and completes the screen rendering processing.

On the other hand, upon determining in step S601 that the rendering server 200R is set in the test mode, in step S604, the selector 505 starts sequentially acquiring rendering commands associated with the target device in the chronological order of association from the accumulation unit 506. Note that a description will be made assuming that in the screen rendering processing according to this embodiment, a log of rendering commands for one target device is accumulated in the accumulation unit 506 for the sake of simplicity. However, the present invention is not limited to this, and when, for example, conducting a test associated with a game to be simultaneously played by a plurality of persons, the log of rendering commands may be accumulated in the accumulation unit 506 for each of a plurality of client devices 120.

In step S605, the selector 505 transmits the sequentially acquired rendering commands to the rendering functional module 280 as target commands based on the information of the reception timings associated with the acquired rendering commands. The information of the reception timings is used to indicate the relative relationship of timings to send the rendering commands continuously stored in the accumulation unit 506 to the rendering functional module 280. That is, as for rendering commands A and B received at an interval of, for example, 35 ms, information "35 ms" can be acquired from the difference between the reception timings. Hence, the selector 505 sends the acquired rendering command A and then the rendering command B after the elapse of 35 ms in an internal timer (not shown).

In step S606, the rendering functional module 280 performs screen rendering processing based on the received target commands. After completion of the rendering processing, for example, the GPU 507 outputs data associated with the rendered screen. Note that the screen generated in this step aims at the test and need not always be transmitted to the target device.

In step S607, the CPU 501 determines whether a rendering command that has not yet been sent by the selector 505 exists in the accumulation unit 506. Upon determining that an unsent rendering command exists, the CPU 501 returns the process to step S605. Upon determining that no unsent rendering command exists, the CPU 501 completes the screen rendering processing.

With this processing, the rendering server 200R according to this embodiment can hold an actually received rendering command in the accumulation unit 506, acquire the rendering command from the accumulation unit 506 in the test mode, and implement sending of the rendering command to the rendering functional module 280 in accordance with, for example, the reception timing. That is, as compared to the conventional case where processing is performed by recording a log of operation inputs from the client device 120, the test of screen rendering processing can be conducted such that the same rendering contents are replicated.

In the system arrangement in which the compute server 200C and the rendering server 200R, that is, the rendering command generator 270 and the rendering functional module 280 are separated, as described in this embodiment, the test is conducted by storing the rendering commands in the above-described way. This enables debug while separating which device is the cause of a bug that has occurred in overall processing associated with a game content. That is, it is therefore possible to perform debug while discriminating which is problematic, processing or hardware associated with generation of a rendering command or processing or hardware for performing screen rendering processing based on a rendering command.

Note that in this embodiment, the rendering commands are stored to replicate the same rendering contents. However, the stored rendering commands are usable for another purpose as well. For example, rendering commands stored in the accumulation unit 506 for each of a plurality of client devices 120 may be sent to the rendering functional module 280 in parallel in accordance with the reception timings as a load test when the rendering server 200R parallelly executes screen rendering processes associated with a plurality of client devices 120. Here, "sending the rendering commands in parallel" means that a plurality of rendering commands are sent to, for example, one or more rendering hardware of the rendering functional module 280 at time, or that each of the plurality of rendering commands are sequentially sent to the one or more rendering hardware within a certain time frame by adjusting the sending timings respectively. At this time, the rendering commands to be sent are not limited to those acquired at the same time or acquired in association with the same game content, and can be selected in accordance with a desired load condition. As described above, in an α test (game play) or the like, the rendering commands can be stored only for a limited number of users. Even in this case, if the rendering server 200R wants to implement a higher load than in game play, a plurality of acquired rendering commands may be output, that is, the number of sets of acquired rendering commands may be increased from one, and, for example, three sets of rendering commands may be sent to the rendering functional module 280. Since the number of screen rendering processes to be parallelly executed can easily be increased, it is possible to easily test errors in the rendering server 200R at the time of load occurrence or while the rendering processes were being executed, the influence on quality of the screen as the rendering result, and the like.

As described above, the information processing apparatus according to this embodiment can replicate the same rendering contents. The information processing apparatus acquires a rendering command used to cause the rendering apparatus to render a screen, and records the acquired rendering command. In addition, the information processing apparatus outputs the recorded rendering command to the rendering apparatus that renders the screen.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. Also, the information processing apparatus and the control method thereof according to the present invention are realizable by a program executing the methods on one or more computer. The program is providable/distributable by being stored on a computer-readable storage medium or through an electronic communication line.

This application claims the benefit of U. S. Provisional Patent Application No. 61/862,590 filed Aug. 6, 2013, which is hereby incorporated by reference herein in its entirety.

The invention claimed is:

1. An information processing apparatus, comprising:
an interface which is able to acquire a rendering command, the rendering command being used to cause a renderer to render a first screen and being generated based on a user input;
a memory which is able to record the rendering command acquired by the interface; and
a processor which is able to duplicate the rendering command recorded by the memory and output a duplicated rendering command to the renderer for rendering a second screen,
wherein the memory records information of a transmission destination of the first screen rendered by the renderer based on the rendering command acquired by the interface, and
the processor duplicates the recorded rendering command acquired for one transmission destination and outputs a plurality of duplicated rendering commands to the renderer.

2. The information processing apparatus according to claim 1, wherein the processor outputs the duplicated rendering command in a case where the interface acquires no rendering command.

3. The information processing apparatus according to claim 1, wherein the processor outputs the plurality of duplicated rendering commands to a plurality of renderers in parallel.

4. The information processing apparatus according to claim 1, wherein the memory records timing information corresponding to one of generation and acquisition of the rendering command in association with the acquired rendering command, and
the processor outputs the duplicated rendering command based on the associated timing information.

5. The information processing apparatus according to claim 1, wherein the renderer is included in the information processing apparatus, and
the processor is able to evaluate one of the second screen rendered by the renderer based on the duplicated rendering command output from the processor and a capability of the information processing apparatus when having rendered the second screen.

6. The information processing apparatus according to claim 1, wherein the interface acquires the rendering command from an external apparatus.

7. A control method of an information processing apparatus, the control method comprising:
acquiring, via an interface, a rendering command, the rendering command being used to cause a renderer to render a first screen and being generated based on a user input;
recording, in a memory, the rendering command acquired by the interface; and
duplicating, by a processor, the rendering command recorded in the memory and outputting the duplicated rendering command to the renderer for rendering a second screen,
wherein the memory records information of a transmission destination of the first screen rendered by the renderer based on the rendering command acquired by the interface, and
the processor duplicates the recorded rendering command acquired for one transmission destination and outputs a plurality of duplicated rendering commands to the renderer.

8. A non-transitory computer-readable storage medium storing a program that causes at least one computer including a renderer to function as an information processing apparatus, the program causing the at least one computer to perform operations comprising:
acquiring a rendering command, the rendering command being used to cause a renderer to render a first screen and being generated based on a user input;
recording the rendering command acquired in the acquiring; and
duplicating the rendering command recorded in the recording and outputting the duplicated rendering command to the renderer for rendering a second screen,
wherein information of a transmission destination of the first screen rendered by the renderer based on the acquired rendering command is recorded, and
the recorded rendering command acquired for one transmission destination is duplicated and a plurality of duplicated rendering commands are output to the renderer.

9. The information processing apparatus according to claim 1, wherein the processor outputs the duplicated rendering command to the renderer via a second interface different than the interface.

* * * * *